(12) United States Patent
Jung

(10) Patent No.: US 6,935,627 B2
(45) Date of Patent: Aug. 30, 2005

(54) COIL SPRING MOUNTING STRUCTURE FOR SUSPENSION STRUT

(75) Inventor: Dall-Hee Jung, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 78 days.

(21) Appl. No.: 10/330,188

(22) Filed: Dec. 30, 2002

(65) Prior Publication Data

US 2004/0004338 A1 Jan. 8, 2004

(30) Foreign Application Priority Data

Jul. 2, 2002 (KR) .................................. 10-2002-0037822

(51) Int. Cl.⁷ ............................................... B60G 15/07
(52) U.S. Cl. ...................... 267/221; 267/286; 267/179; 280/124.154; 280/124.179
(58) Field of Search .................. 280/124.145, 124.146, 280/124.154, 124.179; 267/221, 248, 255, 177, 179, 286

(56) References Cited

U.S. PATENT DOCUMENTS

| | | | |
|---|---|---|---|
| 2,791,440 A | * | 5/1957 | Guidobaldi .................. 267/255 |
| 3,366,400 A | * | 1/1968 | Fitch .................... 280/124.179 |
| 5,092,568 A | * | 3/1992 | Tachikawa et al. ... 280/124.179 |
| 6,612,553 B1 | * | 9/2003 | Aubarede et al. ..... 280/124.179 |

FOREIGN PATENT DOCUMENTS

KR 20000016340 8/2000

* cited by examiner

*Primary Examiner*—Peter C. English
(74) *Attorney, Agent, or Firm*—Greenblum & Bernstein, P.L.C.

(57) ABSTRACT

A coil spring mounting structure for a suspension strut includes a spring bracket secured to a shock-absorber. The spring bracket has a coupling hole, which is configured to receive a screw threaded end of a coil spring. Nuts are screw-coupled to the screw threads of the coil spring, thereby fixing the coil spring to the spring bracket.

11 Claims, 3 Drawing Sheets

COVENTIONAL ART

COIL SPRING MOUNTING STRUCTURE FOR SUSPENSION STRUT

BACKGROUND OF THE INVENTION

1. Field of the Invention

The present invention relates to a suspension strut for a car in which a coil spring is integrated and assembled with a shock-absorber.

2. Background of the Related Art

FIG. 1 is a perspective view showing a conventional car suspension strut (laid-opened Utility Model publication No. 2000-16340).

As shown in FIG. 1, a car suspension strut 100 consists of a shock-absorber 110 for generating a damping force by reciprocating a valve in the interior of the shock-absorber within which oil is filled, and a coil spring 140' located in the outside of the shock-absorber 110 in order to restore a compressed shock-absorber to the former state.

The shock-absorber 110 consists of an external case 111 for receiving the valve (not shown) and a rod 120 connected to the valve (not shown).

To connect a knuckle and a strut, a knuckle bracket 112 is mounted on the external case 111. A lower spring seat 150 is fixed to the external case 111 above the knuckle bracket 112. According to the fixed location of the strut, instead of the knuckle bracket 112, a cylindrical shaped bracket may be mounted on the lower portion of the external case 111.

A lower spring pad 152 consisting of rubber material rests above the lower spring seat 150 and a coil spring 140' is mounted above the lower spring pad 152.

Also, an upper spring pad 162 is mounted above the coil spring 140 and then an upper spring seat 160 is inserted onto the rod 120 of the shock-absorber 110.

An insulator 130 is mounted on the upper spring seat 160 in such a manner that the upper spring seat 160 and the insulator 130 are fixed to the rod 120 of the shock-absorber by a nut 125. When the strut is installed in the front of a car, a bearing (not shown) may be installed in the inside of the insulator 130 so that the strut is rotated to a car body upon steering.

A bolt 132, mounted on the insulator 130, is a member fixing the strut 100 to the car body.

That is, the conventional suspension strut for the car has adopted a structure in which the lower spring seat 150 is fixed to the external case 111 of the shock-absorber through a welding and then the coil spring 140' is installed in the lower spring seat 150. Accordingly, a portion (hereinafter, referred to as a bottom part) at which the coil spring 140' is contacted to the lower spring seat 150 is necessary.

The bottom part is commonly set to 0.75 turns on the basis of the number of winding turns of the coil spring 140'. In the case that a lower spring pad 152 is installed between the coil spring 140' and the lower spring seat 150, the bottom part is likewise included in the coil spring 140'.

Similarly, the coil spring 140 mounted on the conventional car suspension strut has a structure in which the coil spring includes a top part that contacts with the upper spring seat 160.

In the above-described conventional art, there was a problem in that the setting of the bottom part having 0.75 turns of a coil spring is required and a material cost of the coil spring is high since the bottom part does not provide a spring function.

Further, to avoid the coil being located at the region neighboring the bottom part from being contacted with the spring seat to generate a stress concentration when the coil spring is subject to an overload, a lower spring pad or an upper spring pad may be adopted. However, another problem is that the spring pad that receives the bottom part of the coil spring is enlarged in size, thereby increasing the manufacturing cost.

SUMMARY OF THE INVENTION

An object of the invention is to solve at least the above problems and/or disadvantages and to provide at least the advantages described hereinafter.

Accordingly, one object of the present invention is to solve the foregoing problems by providing a coil spring mounting structure of a suspension strut that minimizes a bottom part of a coil spring, thereby reducing the material cost of the coil spring and simplifying a structure of a bushing mounted between the coil spring and the shock-absorber.

To achieve the above object, a coil spring mounting structure for a suspension strut of the present invention comprises a spring bracket fixed to a shock-absorber and having a coupling hole; a coil spring inserted to the coupling hole, having screw threads formed on an end thereof; and nuts screw-coupled with the screw threads for fixing the coil spring to the spring bracket.

Also, the coil spring mounting structure for the suspension strut of the present invention further comprises a second bracket fixed to the shock-absorber; a clamp located on the surface of the second bracket; bolts and nuts for fixing the second bracket and the clamp; and a bushing inserted between the clamp and the coil spring, the bushing having a through hole.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Now, a preferred embodiment of the present invention will be described in reference to the accompanying FIGS. 2 to 5. Elements similar to those used in the conventional art are omitted in the figures.

Figure 2:
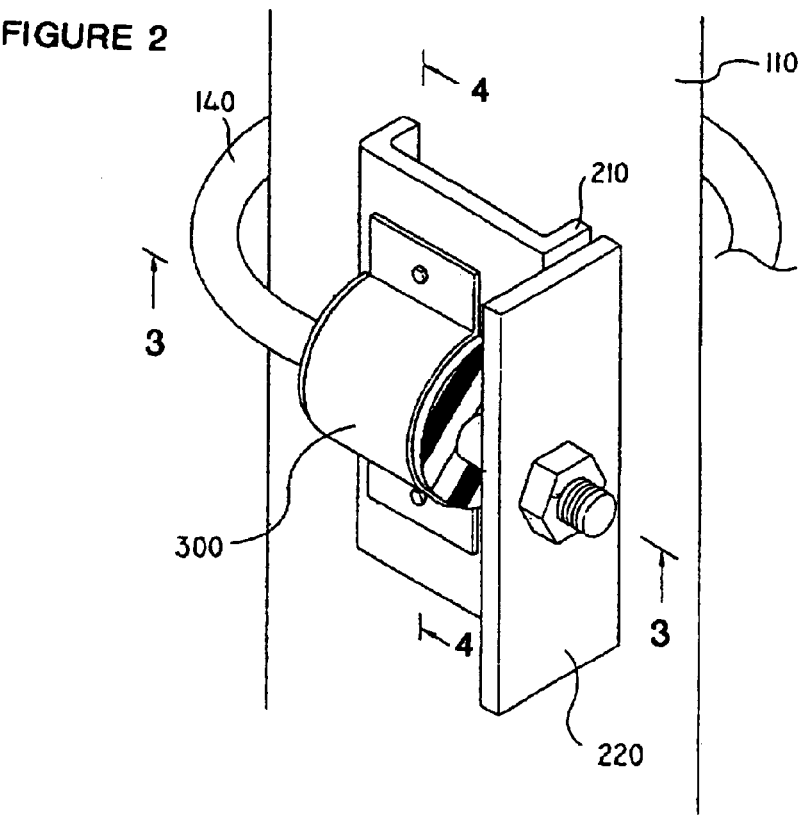
FIG. 2 is a perspective view showing a mounting structure of a coil spring in accordance with the present invention.
Figure 3:
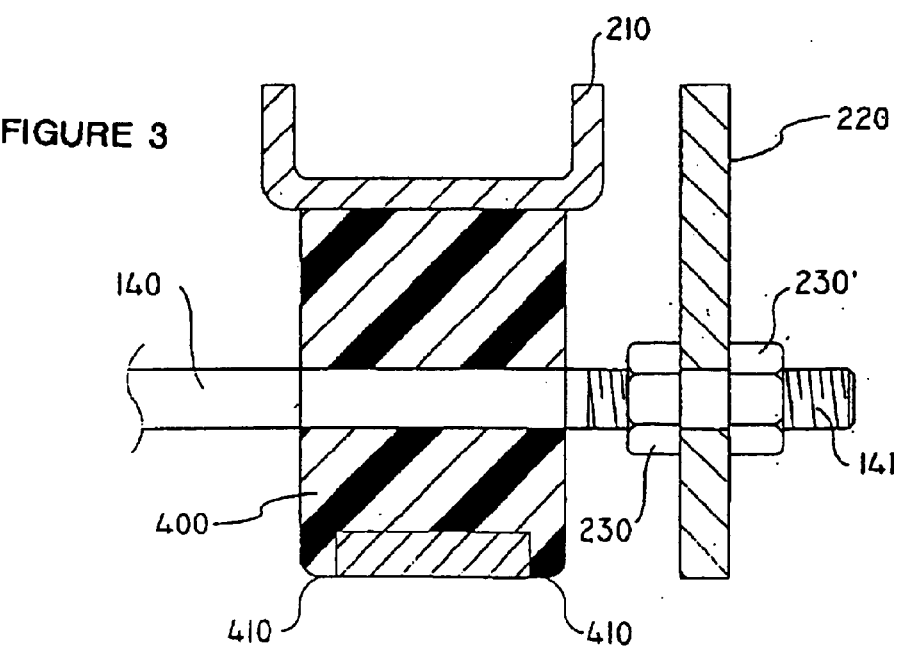
FIG. 3 is a sectional view taken along line 3—3 of FIG. 2.
Figure 4:
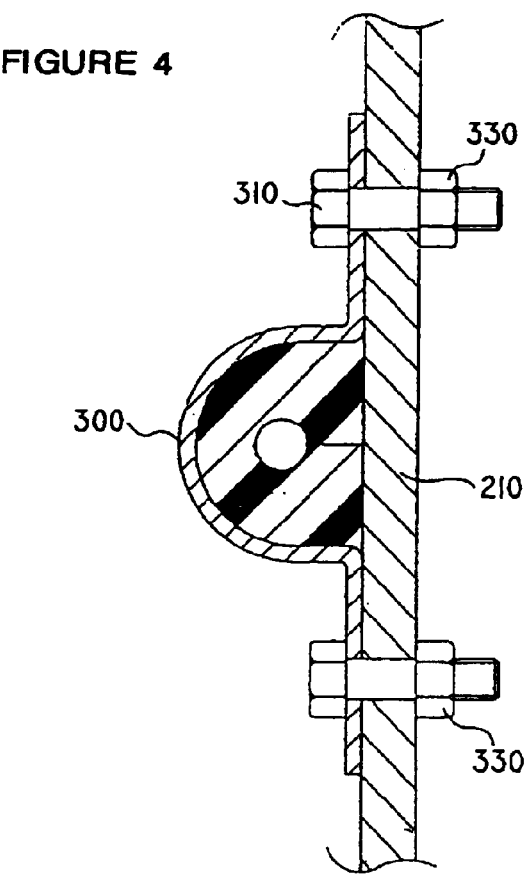
FIG. 4 is a sectional view taken along line 4—4 of FIG. 2.

Referring to FIG. 2, a spring bracket 220 and a second bracket 210 are fixed to an external case 111 of a shock-absorber 110 through a welding.

A coupling hole for receiving a screw thread 141 of a coil spring (will be described hereinafter) 140 is formed in the spring bracket 220.

The screw thread portion 141 formed on the coil spring 140 is inserted into the coupling hole of the spring bracket 220 and then fixes the coil spring 140 and the spring bracket 220 through nuts 230, 230'.

A second bracket 210 neighboring the spring bracket 220 is fixed to the shock-absorber 110. The second bracket 210 has a U-shaped section. Preferably, the second bracket 210 is mounted so that the longitudinal direction thereof is the same as the longitudinal direction of the shock-absorber.

A clamp 300 is located on the surface of the second bracket 210, and the clamp 300 and the second bracket 210 are fixed by bolts 310 and nuts 330.

A bushing 400 is inserted between the coil spring 140 and the clamp 300.

Figure 5:
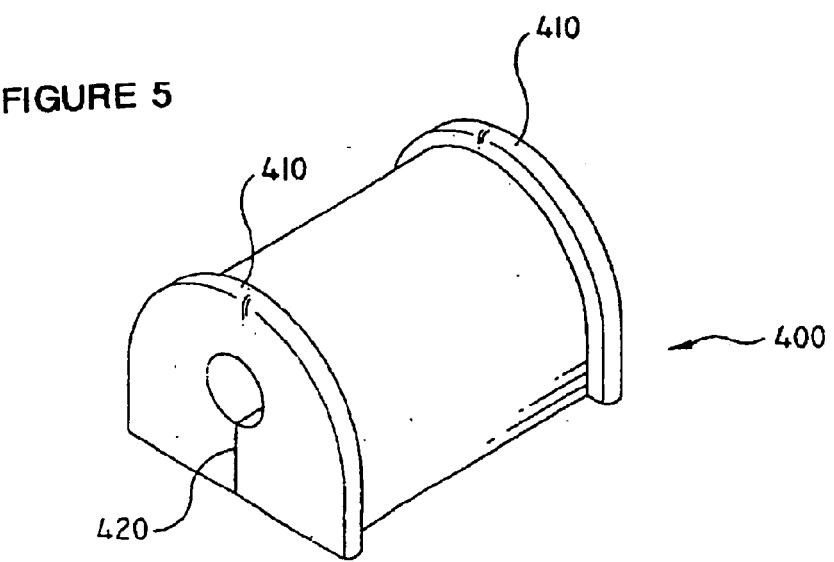
FIG. 5 is a perspective view of a bush.

As shown in FIG. 5, the bushing 400 has projection jaws 410 formed on both ends of a main body in which a through hole is formed. A slit 420 is formed between the through hole and a bottom of the bushing.

The second bracket 210 and the spring bracket 220 of the present invention may be provided in an external case of the shock-absorber and also may be provided in a rod located above the strut. That is, the brackets can be applied to a lower mounting structure as well as an upper mounting structure of the coil spring of the present invention.

Figure 1:
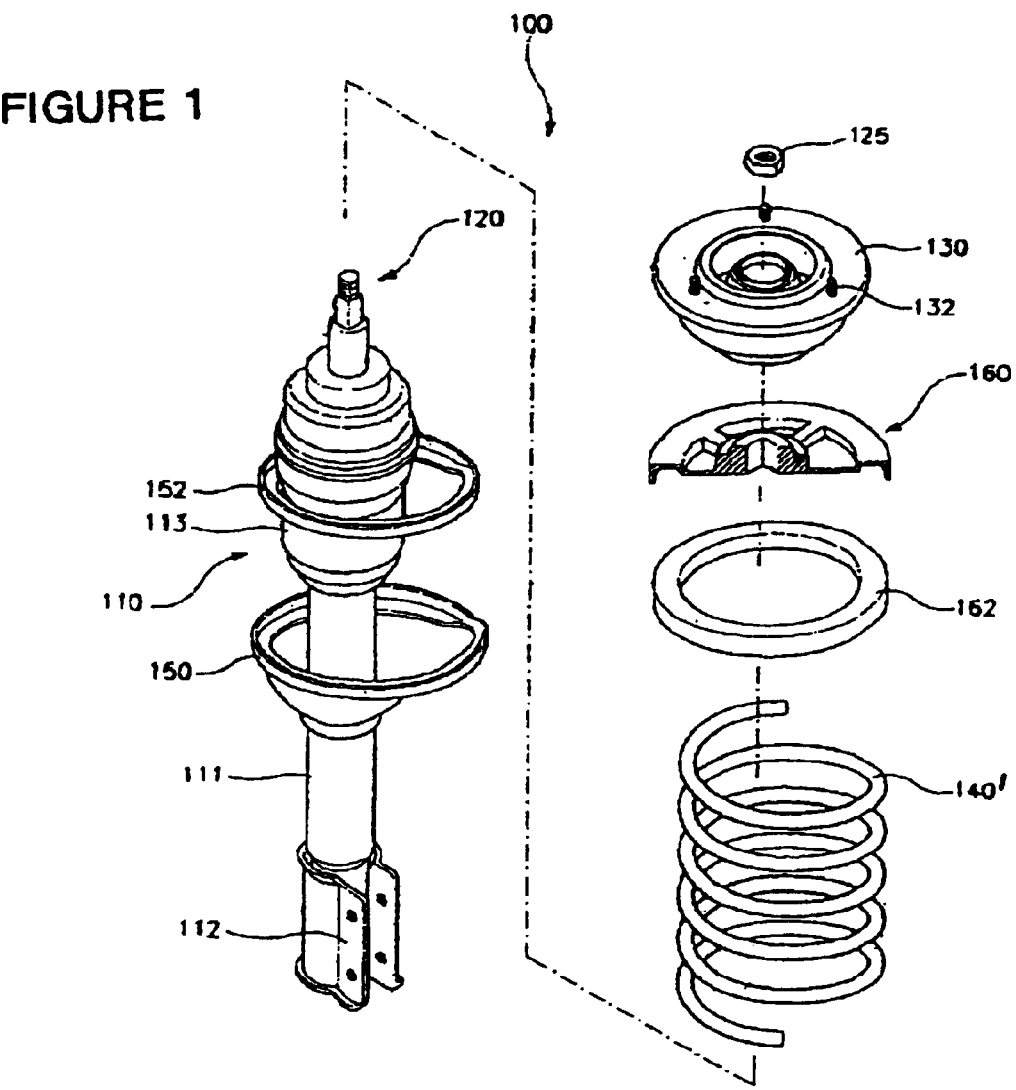
FIG. 1 is a perspective view showing a conventional strut.

Since the remaining structures of the car suspension strut of the present invention, except for the above-described parts referred to in FIGS. 2 to 5 are the same as those of the conventional art shown in FIG. 1, the description of parts such as a knuckle bracket, an insulator 130, etc., is omitted.

Now, an operation of the present invention will be described.

First, the nut 230 is screw-coupled with the screw portion 141 formed on the end of the coil spring 140, and the remaining portion of the screw portion 141 is inserted into the coupling hole of the spring bracket 220. Another nut 230' is screw-coupled with the end of the coil spring 140. The nut 230' is tightened with a defined coupling torque to fix the coil spring 140 to the spring bracket 220.

Because the coil spring 140 is fixed to the spring bracket 220 by nuts 230 and 230', it is not required that the 0.75 turns of the bottom part are formed as in the conventional art. That is, most of the coils except for the screw portion 141 of the coil spring 140 provide an effective number of turns.

In the case of controlling a location at which the coil spring 140 is mounted on the spring bracket 220 by tightening nuts 230 and 230', the effective number of turns of the coil spring 140' is changed and accordingly a spring coefficient is also changed. That is, because the spring coefficient is changed when the locations of nuts 230 and 230' screw-coupled on the coil spring 140' are changed, it is possible that a characteristic of the device of the coil spring 140' is finely tuned.

The coil spring 140 fixed to the shock-absorber may be mounted through the bushing 400. That is, after widening the slit 420 in the bushing 400, the coil spring 140 is inserted into the slit and then the clamp 300 is covered thereon. The clamp 300 and the second bracket 210 of the shock-absorber are fixed by bolts 310 and nuts 330. The projection jaws 410 formed on the bushing 400 prevent the bushing 400 from being separated from the clamp 300.

Because the bushing 400 is made of rubber material, when the load applied to the coil spring 140 is transferred to the shock-absorber, the bushing performs a vibration-proof function.

As the present invention adopts a structure in which a screw is formed on an end of a coil spring and the screw is fixed to a spring bracket by nuts, a material loss due to the bottom part as in the conventional art does not occur. That is, because the portion, which does not act as effective number of turns in the portion at which the coil spring and the spring bracket are coupled to each other, is minimized, the material cost and weight of the bottom part corresponding to the 0.75 number of turns of the coil spring is decreased.

Also, in accordance with the present invention, because the location of the portion at which the end of the coil spring and the spring bracket are coupled is controlled by nuts, it is possible that the spring coefficient of the coil spring is controlled finely.

Also, because the present invention adopts the structure in which the coil spring is fixed to the shock-absorber using the clamp and bushing, a large lower spring pad or a large upper spring pad as in the conventional art is not required, thereby reducing the material cost.

Further, in accordance with the present invention, the projection jaws and the slit are formed in the bushing, thereby facilitating an assembly of the bushing and preventing the bushing from being separated form the clamp.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A coil spring mounting structure for a suspension strut comprising:
   a spring bracket fixed to a body of a shock-absorber and having a coupling hole;
   a coil spring inserted into the coupling hole, the coil spring having screw threads formed on an end thereof;
   nuts screw-coupled with the screw threads for fixing the coil spring to the spring bracket;
   a second bracket fixed to the shock-absorber;
   a clamp located on a surface of the second bracket;
   bolts and nuts for fixing the second bracket and the clamp; and
   a bushing between the clamp and the coil spring, said bushing having an aperture.

2. The coil spring mounting structure for a suspension strut according to claim 1, further comprising projection jaws formed on more than one side of the bushing and a slit formed between the aperture and an outer surface of the bushing.

3. The coil spring mounting structure according to claim 1, wherein the clamp extends over the coil spring.

4. The coil spring mounting structure according to claim 1, wherein the second bracket is mounted to the body of the shock absorber, the second bracket supporting the clamp that extends over the coil spring.

5. The coil spring mounting structure according to claim 1, wherein the aperture is configured to receive a portion of the coil spring.

6. The coil spring mounting structure according to claim 5, wherein the clamp extends over the bushing.

7. A coil spring mounting structure for a suspension strut, comprising:
   a coil spring having a threaded portion;
   a spring bracket fixed to a body of a shock absorber, the spring bracket having a coupling hole to receive the threaded portion of the coil spring;
   at least one nut configured to secure the threaded portion of the coil spring to the spring bracket;
   a second bracket mounted to the body of the shock absorber, the second bracket supporting a clamp that extends over the coil spring; and at least one nut and at least one bolt that secures the clamp to the second bracket.

8. The coil spring mounting structure for a suspension strut according to claim 7,
wherein the clamp is mounted on the second bracket with a portion of the coil spring positioned between the clamp and the second bracket.

9. The coil spring mounting structure according to claim 7, further comprising a bushing having an aperture that is configured to receive a portion of the coil spring.

10. The coil spring mounting structure according to claim 9, wherein the clamp extends over the bushing.

11. A coil spring mounting structure for a suspension strut comprising:
- a spring bracket secured to a shock-absorber, the spring bracket having a coupling hole;
- a coil spring inserted into the coupling hole, the coil spring having screw threads formed on an end thereof;
- nuts screw-coupled with the screw threads to fix the coil spring to the spring bracket;
- a second bracket secured to the shock-absorber;
- a clamp extending over a surface of the second bracket;
- bolts and nuts securing the second bracket and the clamp; and
- a bushing positioned between the clamp and the coil spring, said bushing having an aperture, said coil spring extending through the aperture.

* * * * *